(12) United States Patent
Ikegami

(10) Patent No.: US 6,345,220 B1
(45) Date of Patent: Feb. 5, 2002

(54) PASSENGER PROTECTING DEVICE FOR VEHICLE

(75) Inventor: Kenji Ikegami, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/467,911

(22) Filed: Dec. 21, 1999

(30) Foreign Application Priority Data

Dec. 25, 1998 (JP) .......................... 10-369675

(51) Int. Cl.[7] .................. B60R 21/00; B60R 21/32
(52) U.S. Cl. ........................... 701/45; 280/735
(58) Field of Search ................. 701/45; 280/734, 280/735

(56) References Cited

U.S. PATENT DOCUMENTS

| | | | |
|---|---|---|---|
| 5,071,160 A | * 12/1991 | White et al. | 280/735 |
| 5,357,141 A | * 10/1994 | Nitschke et al. | 307/10.1 |
| 5,737,335 A | * 4/1998 | Mizuta et al. | 370/444 |
| 5,906,393 A | * 5/1999 | Mazur et al. | 280/735 |
| 5,964,816 A | * 10/1999 | Kincaid | 701/45 |
| 6,188,314 B1 | * 2/2001 | Wallace et al. | 340/438 |

FOREIGN PATENT DOCUMENTS

JP          10-175503         6/1998

* cited by examiner

*Primary Examiner*—Michael J. Zanelli
(74) *Attorney, Agent, or Firm*—McDermott, Will & Emery (57) ABSTRACT

A passenger protecting device for a vehicle includes a central control unit. The central control unit communicates with a plurality of terminal units through a single communication line at intervals of a predetermined cycle to collect the plural informations. The central control unit further determines the operating condition of a passenger protecting unit and controls the operation of a passenger protecting unit. The central control unit carries out the communication with slave units (1, 2) detecting the informations of high priority at intervals of a predetermined cycle T0 and also carries out the communication with slave units (3, 4) detecting other informations of low priority in sequence at intervals of the predetermined cycle T0. Consequently, without changing the communication method with the plural terminal units before and after the vehicle's collision, the device can collect the informations of high priority at short intervals and the informations of low priority at long intervals.

10 Claims, 5 Drawing Sheets

PASSENGER PROTECTING DEVICE FOR VEHICLE

BACKGROUND OF THE INVENTION

1. Field of the Invention

The present invention relates to a passenger protecting device, such as an air bag inflating unit and a seat belt tensing unit, and particularly, it relates to an improvement of communicating method for information about a passenger on a vehicle.

2. Description of the Related Art

Japanese Patent Publication No. 10-175503 discloses a passenger protecting device which detects the passenger's situation at the vehicle's collision and also determines the inflating conditions of an air bag.

In the passenger protecting device of this kind, informations about the presence of a seated passenger, the passenger's seating position, the presence of a child seat on the seat, etc. are collected by means of a load sensor, a position sensor, etc. Upon overall judgement with reference to these informations, the passenger protecting device further controls a pressure for inflating the air bag. In detail, when the assistant driver's seat is not occupied with a passenger or when the child seat has been set up on the assistant driver's seat, the air bag is not inflated in spite of the vehicle's collision. Further, when the passenger just after the vehicle's collision is tumbling forward to the vehicle front or when the seat belt has been fastened over the passenger, the air bag is inflated under a reduced inflating pressure at the vehicle's collision.

Meanwhile, as to the collection of various informations by means of some terminal units disposed in the driver's seat and the assistant driver's seat, it should be noted that the information about the presence of the passenger on seat, the presence of the child seat, etc. does not alter before and after the vehicle's collision at all. Thus, even if this kind of information is collected at relatively long intervals, there would be no problem. On the contrary, the information about the passenger's seating position etc. continuously changes during the vehicle's traveling. Particularly, such information greatly alters before and after the vehicle's collision. Thus, due to the high priority, such information has to be collected at relatively short intervals.

Therefore, it will be expected of a communication method where both communication object and period are changed so that the communication units is normally performed with all of terminal units at relatively long communication intervals, while the communication with the terminal unit of high priority is performed at relatively short communication intervals once the vehicle's collision is detected. However, if the communication object and period are not changed at the vehicle's collision certainly, there would be occurred a situation where the information about the passenger's position just after the vehicle's collision, which is required for determining the inflating pressure of air bag, is not obtained. Consequently, it is difficult to determine when the communication object and period should be changed.

SUMMARY OF THE INVENTION

Under such a circumstance, it is an object of the present invention to provide a passenger protecting device which is capable of collecting informations for determining the conditions for operating a passenger protecting unit, through terminal units at appropriate cycles corresponding to the information priority, without changing the communication method with the plural terminal units before and after the vehicle's collision.

According to the invention, the above-mentioned object is accomplished by a passenger protecting device for a vehicle, comprising:

a passenger protecting unit to be arranged in the vicinity of a passenger on the vehicle, for protecting the passenger;

a plurality of terminal units arranged in the vehicle, for detecting a plurality of information about the passenger and a loadage on the seat; and a central control unit which communicates with the plural terminal units through a single communication line at intervals of a predetermined cycle thereby to collect the plural information and which determines the operating condition of the passenger protecting unit and also controls the operation of the passenger protecting unit;

wherein the central control unit carries out the communication with at least one terminal unit detecting an information of high priority at every interval of the predetermined cycle and also carries out the communication with the other terminal units detecting other information of low priority in sequence at intervals of the predetermined cycle.

The above and other features and advantages of this invention will become apparent, and the invention itself will best be understood, from a study of the following description and appended claims, with reference to the attached drawings showing one preferred embodiment of the invention.

DESCRIPTION OF THE PREFERRED EMBODIMENT

We now describe an embodiment where the present invention is applied to an air bag inflating unit for the driver's seat and the assistant driver's seat. Note, with no limitation of the air bag inflating unit for the driver's seat and the assistant driver's seat, the present invention is also applicable to other passenger protecting devices, for example, a side air bag inflating unit, a seat belt tensing unit (tensioner), etc.

Figure 1:
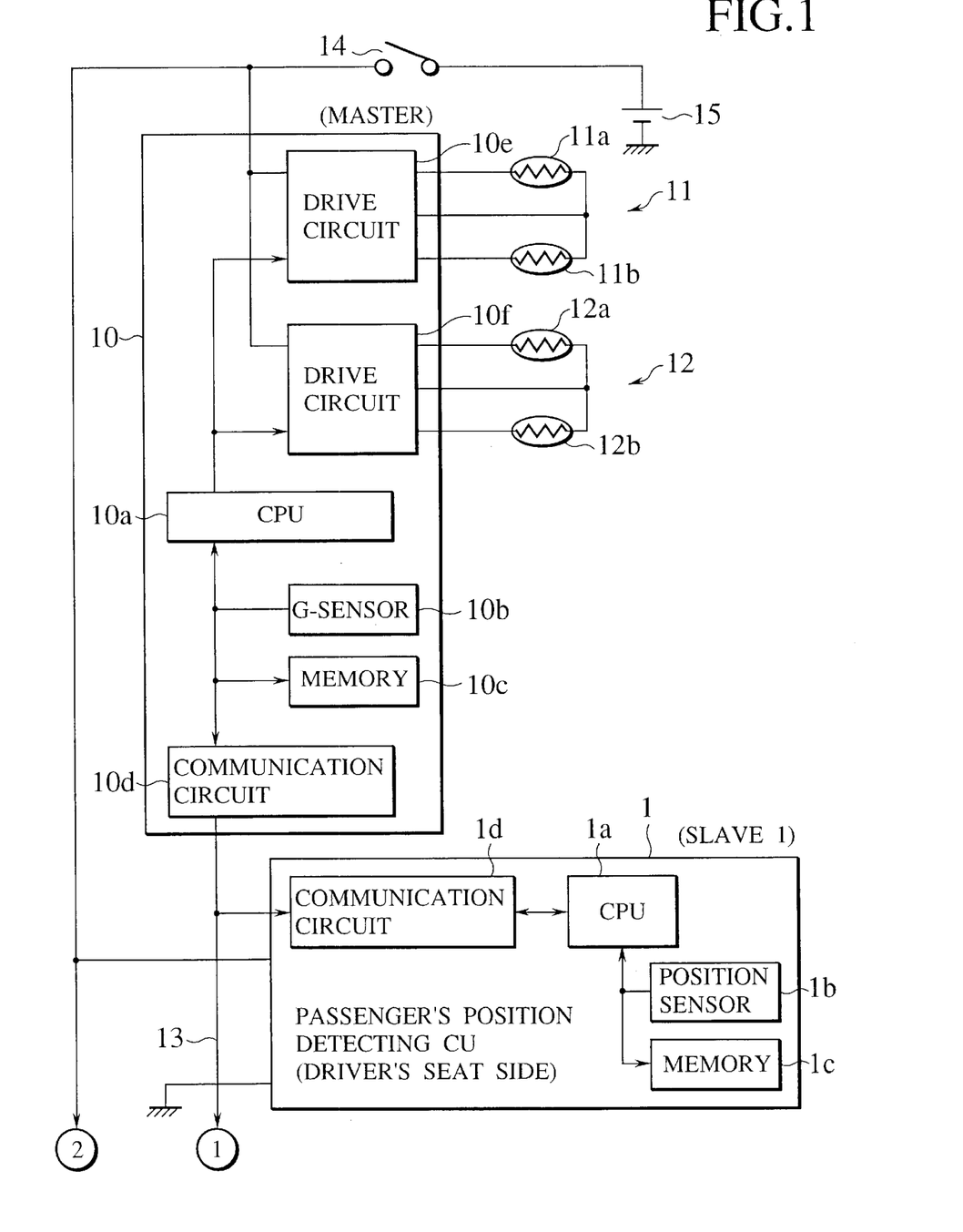
FIG. 1 is a diagram showing the constitution of a passenger protecting device in accordance with one embodiment of the invention.
Figure 2:
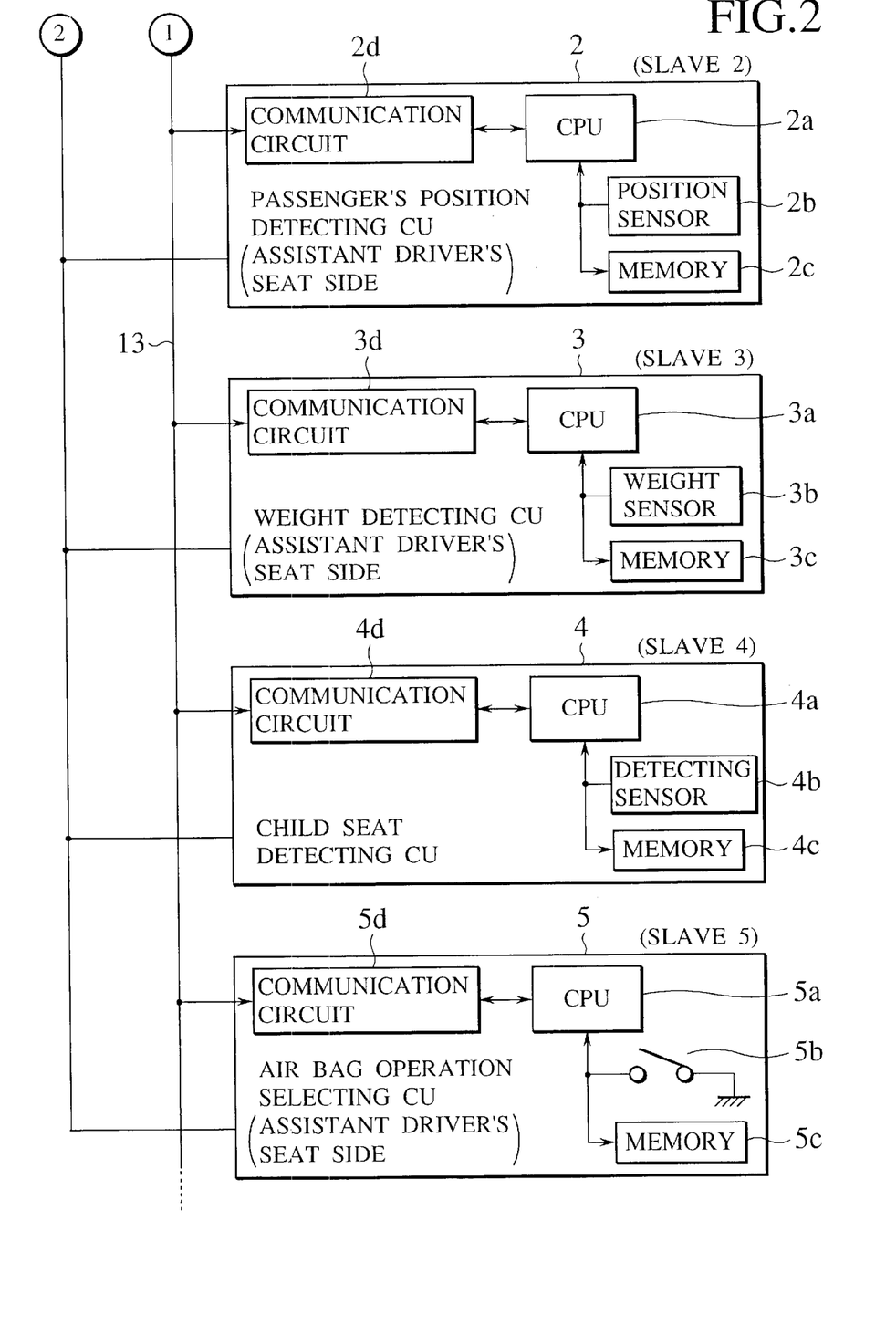
FIG. 2 is a diagram showing the constitution of the passenger protecting device, following FIG. 1.

FIGS. 1 and 2 show the constitution of one embodiment of the invention.

The passenger protecting device of the embodiment is constituted by an air bag control unit 10 having a central control unit for executing the inflation control of air bags 11, 12 (passenger protecting units) arranged on the driver's seat and the assistant driver's seat, and a variety of control units 1–5 (terminal units) for providing various information for the air bag inflation control to the air bag control unit 10. The air bag control unit 10 functions as a master control unit (simply referred to "master unit" or "master", hereinafter) and carries out the serial communication with the control units 1–5 as slave control units (simply referred to "slave units" or "slave", hereinafter) through a single communication line 13.

The air bag control unit (master unit) 10 includes a micro-computer 10a, a G-sensor 10b, a memory 10c, a communication circuit 10d and drive circuits 10e, 10f and judges the vehicle's collision on the ground of a deceleration rate G detected by the G-sensor 10b. Additionally, the air bag control unit 10 determines the inflating condition on the basis of various informations about the presence of the seating passengers, the presence of the child seat, the seating position of the passengers, the presence of the passengers equipped with the seat belts and so on, which are collected by the respective slave units and also controls to inflate the driver's seat air bag 11 and the assistant driver's air bag 12 through the drive circuits 10e, 10f. The air bags 11, 12 are provided with two pairs of inflators (not shown) and squibs 11a, 11b, 12a, 12b, respectively. Thus, corresponding to situations of the passenger(s) and loads, such as child seat, just after the vehicle's collision, the air bags 11, 12 are adapted so as to control their inflation mode (i.e. single inflation of either one of the air bags 11, 12; both inflations; not inflating) and inflating condition (i.e. inflating pressure). Stored in the memory 10c are respective ID (identification) codes of the slave units 1–5 which are used for the ID check of the units 1–5.

The passenger's position (on the driver's seat side) detecting control unit 1 (i.e. the slave unit 1) includes a micro-computer 1a, a position sensor 1b, a memory 1c and a communication circuit 1d and detects the seating position of the passenger on the driver's seat by the position sensor 1b thereby to transmit the detected position to the master unit 10. For example, an ultrasonic sensor may be used for the position sensor 1b. The ID code of the slave unit 1 is stored in the memory 1c.

The passenger's position (on the assistant driver's seat side) detecting control unit 2 (i.e. the slave unit 2) includes a micro-computer 2a, a position sensor 2b, a memory 2c and a communication circuit 2d and detects the seating position of the passenger on the assistant driver's seat by the position sensor 2b thereby to transmit the detected position to the master unit 10. For example, an ultrasonic sensor may be used for the position sensor 2b. The ID code of the slave unit 2 is stored in the memory 2c.

The weight (on the assistant driver's seat side) detecting control unit 3 (i.e. the slave unit 3) includes a micro-computer 3a, a weight sensor 3b, a memory 3c and a communication circuit 3d and detects the load on the assistant driver's seat by the weight sensor 3b thereby to transmit the detected position to the master unit 10. For example, a pressure sensor may be used for the weight sensor 3b. The ID code of the slave unit 3 is stored in the memory 3c.

The child seat detecting control unit 4 (i.e. the slave unit 4) includes a micro-computer 4a, a detection sensor 4b, a memory 4c and a communication circuit 4d and detects both presence and direction of the child seat on the assistant driver's seat by the detection sensor 4b thereby to transmit them to the master unit 10. For example, a pressure sensor may be used for the weight sensor 3b. The ID code of the slave unit 4 is stored in the memory 4c.

The air bag (on the assistant driver's seat side) operation selecting control unit 5 (i.e. the slave unit 5) includes a micro-computer 5a, an operation selecting switch 5b, a memory 5c and a communication circuit 5d and transmits the information about operative or inoperative air bag on the assistant driver's seat side, which has been selected through the switch 5b, to the master unit 10. In case of no necessity to inflate the air bag 12 on the assistant driver's seat side such that the child seat is being set up on the assistant driver's seat, it is possible to select the operation of the air bag 12 so as to be inoperative through the switch 5b. The ID code of the slave unit 5 is stored in the memory 5c.

The master unit 10 and the respective slave units 1–5 are all powered by a battery 15 through an ignition switch 14.

Figure 3:
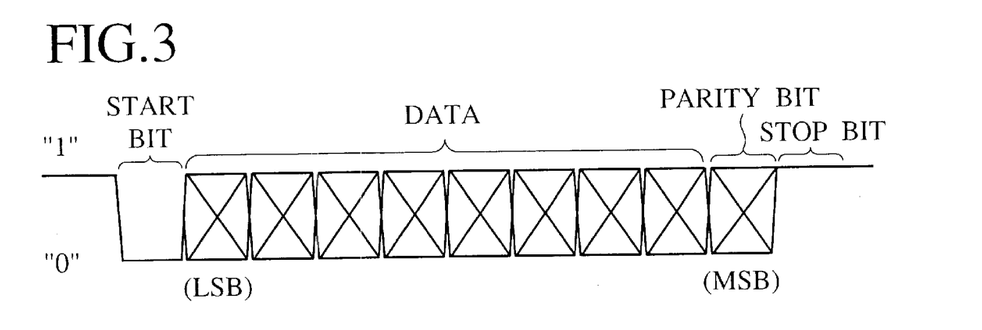
FIG. 3 is a diagram showing a frame format in communication between a master unit and slave units.

On the serial communication with the respective slave units 1–5 via the single communication line 13, the master unit 10 collects the information for executing the inflation control of the air bags 11, 12. The frame format in communication between the master unit 10 and the slave units 1–5 is shown in FIG. 3. The communication frame is constituted by one bit of start bit, one byte of data, one bit of parity bit and one bit of stop bit. The start bit is set to a logical value of "0", while the stop bit is set to a logical value of "1". Further, the parity bit is established to be an even parity.

Next, the format and contents of the data bits will be described below.

Figure 4:
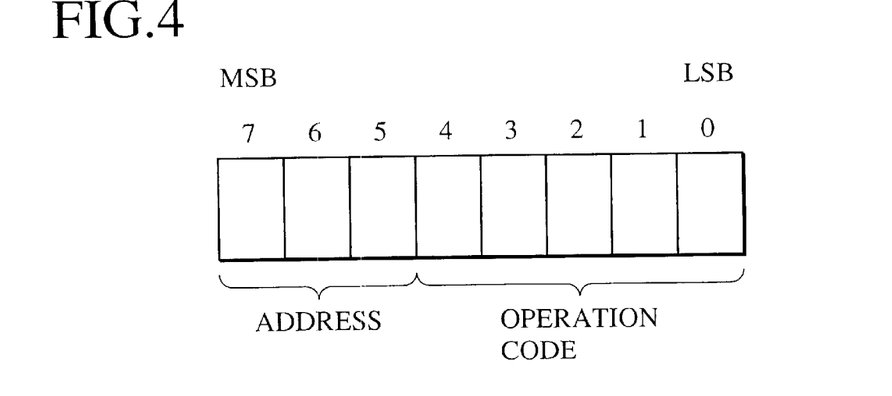
FIG. 4 is a diagram showing a data format of a command to be fed from the master unit to the slave units.
Figure 5:
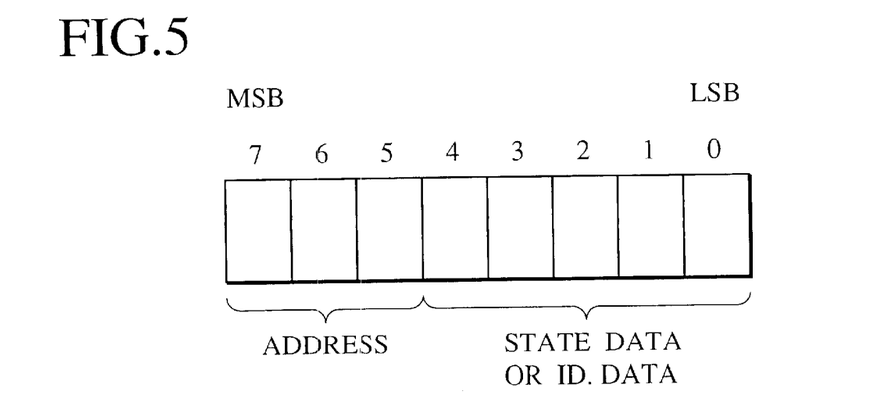
FIG. 5 is a diagram showing a data format of a command to be fed from the slave units to the master unit.

FIG. 4 shows the data format of command to be fed from the master unit 10 to the slave units 1–5. In this data format, three bits in a higher rank (MSB) are used for nominating the address of the slave units, while five bits in a lower rank (LSB) are used for nominating the operational code. Further, FIG. 5 shows the data format to be fed from the slave units 1–5 to the master unit 10. In this data format, three bits in a higher rank (MSB) are used for representing the address of the slave units, while 5 bits in a lower rank (LSB) are used for representing the state data (e.g. position, weight, switch, etc.) or the ID data.

Figure 6:
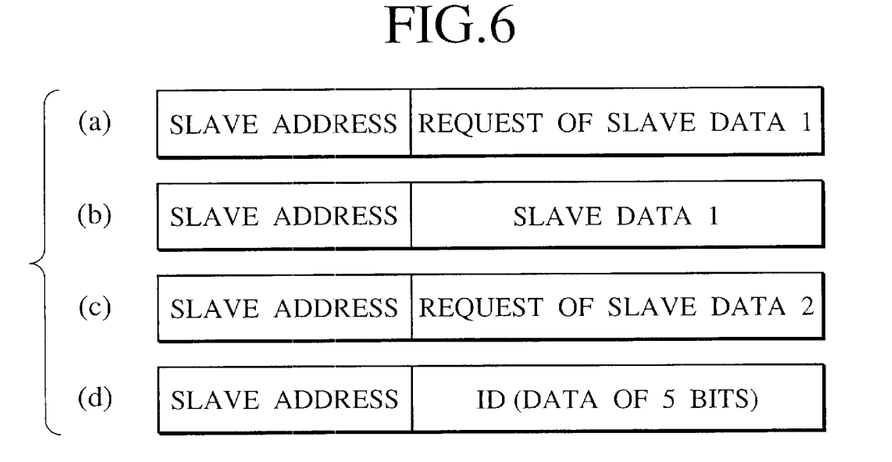
FIG. 6 is a diagram showing a data constitution used in the communication between the master unit and the slave units.

FIG. 6 shows the data structure used for the communication between the master unit 10 and the slave units 1–5. In the figure, an alphabet (a) designates the data structure in case of requesting a slave data 1 from the master unit 10 to the slave units 1–5; (b) the data structure in case of the slave's responding to the request of (a); (c) the data structure in case of requesting a slave data 2 from the master unit 10 to the slave units 1–5; and alphabet (d) designates the data structure in case of the slave's responding to the request of (c).

The address of 3 bits for the respective slave units 1–5 is defined as the following table.

TABLE 1

| Slave ECU | MSB address (binary expression) |
|---|---|
| Passenger's position (driver's seat side) detecting CU (slave 1) | 001 |
| Passenger's position (assistant driver's seat side) detecting CU (slave 2) | 010 |
| Assistant driver's seat weight detecting CU (slave 3) | 011 |
| Child seat detecting CU (slave 4) | 100 |
| Air bag operation selecting CU (slave 5) | 101 |

TABLE 1-continued

| Slave ECU | MSB address (binary expression) |
|---|---|
| Expansion CU1 (slave 6) | 110 |
| Expansion CU2 (slave 7) | 111 |

Further, the operational code of 5 bits for the command fed from the master unit 10 to the slave units 1–5 is defined as the following table.

TABLE 2

| Command | Operational code (binary) |
|---|---|
| Request of slave data 1 | 10101 |
| Request of slave data 2 | 01010 |

Again, the slave data 1 fed from the slave units 1–5 to the master unit 10 is defined as follows.

TABLE 3

| | Slave Data 1 item | | Slave data bit LSB 4 3 2 1 0 |
|---|---|---|---|
| Slave 1 | Information before | Before decision* | 0 — — — — |
| Slave 2 | decision | After decision | 1 — — — — |
| | Information | Sensor | — 1 0 — — |
| | of malfunction | Circuit(unit) | — 0 1 — — |
| | | Normal* | — 1 1 — — |
| | Information of | Safety zone* | — — — 1 1 |
| | passenger's position | Keep out zone | — — — 0 0 |
| Slave 3 | Information before | Before decision* | 0 — — — — |
| | decision | After decision | 1 — — — — |
| | Information | Sensor | — 1 0 — — |
| | of malfunction | Circuit(unit) | — 0 1 — |
| | | Normal* | — 1 1 — — |
| | Information of weight | Light* | — — — 1 1 |
| | | Heavy | — — — 0 0 |
| Slave 4 | Information before | Before decision* | 0 — — — — |
| | decision | After decision | 1 — — — — |
| | Information | Sensor | — 1 0 — — |
| | of malfunction | Circuit(unit) | — 0 1 — — |
| | | Normal* | — 1 1 — — |
| | Information about | Others* | — — — 1 1 |
| | discrimination of child seat | Child seat | — — — 0 0 |
| Slave 5 | Information before | Before decision* | 0 — — — — |
| | decision | After decision | 1 — — — — |
| | Information | Sensor | — 1 0 — — |
| | of malfunction | Circuit(unit) | — 0 1 — — |
| | | Normal* | — 1 1 — — |
| | Information about | Operative* | — — — 1 1 |
| | operative selection of air bag | Inoperative | — — — 0 0 |

Note: a mark * is an initial value.

Meanwhile, as mentioned before, since the informations about the presence of the passenger on seat and the presence of the child seat do not change before and after the vehicle's collision, there would be no problem even if collecting such informations at relatively long cycles. On the contrary, since the information about the passenger's seating position continuously changes and particularly changes greatly before and after the vehicle's collision, the information has to be collected at relatively short cycles because of its high priority.

In this embodiment, the information for determining the inflating pressure and speed of the air bags, namely, the information of high priority requiring the sampling at short cycles (for example, the order of msec.) is called "dynamic data". While, the information for determining the inflating or not inflating of the air bags, namely, the information of low priority which would make no problem even if collected at long cycles (for example, the order of sec.) is called "static data", hereinafter.

Table 4 shows the slave data that the master unit 10 does receive from the slave units 1–5.

TABLE 4

| Slave CU | Slave data 1 | Slave data 2 |
|---|---|---|
| Passenger's (driver's side) position detecting CU (slave 1) | Dynamic data [A1] (inf. about position, malfunction, etc. stored) | Static data [A2] (JD code and reserve data stored) |
| Passenger's (assistant driver's side) position detecting CU (slave 2) | Dynamic data [B1] (inf. About position, malfunction, etc. stored) | Static data [B2] (ID code and reserve data stored) |
| Assistant driver's seat weight detecting CU (slave 3) | Static data ]C1] (inf. About weight, malfunction, etc. stored) | Static data [C2] (ID code and reserve data stored) |
| Child seat detecting CU (slave 4) | Static data [E1] (inf. About presence and direction of CRS, malfunction, etc. stored) | Static data [D2] (ID code and reserve data stored( |
| Air bag operation selecting CU (slave 5) | Static data [E1] (inf. About selection, malfunction, etc. stored) | Static data [E2] (ID code and reserve data stored) |
| Expansion CU1 (slave 6) | Static data [F1] | Static data [F2] (ID code and reserve data stored) |
| Expansion CU2 (slave 7) | Static data [G1] | Static data [G2] (ID code and reserve data stored) |

In Table 4, the respective slave units 1–5 include two kinds of data wherein the slave data 1 stores the essential informations about the slave units 1–5, while the slave data 2 stores the ID code informations of the slave units 1–5. In the slave data 1 of the passenger's position (on the driver's seat side) detecting control unit 1, there is stored the informations of high priority that the master unit 10 has to collect at short cycles, that is, the information about the passenger's position on the driver's seat side and the information about the malfunction of the units. These data will be called "dynamic data [A1]". In the slave data 1 of the passenger's position (on the assistant driver's seat side) detecting control unit 2, there is stored the informations of high priority that the master unit 10 has to collect at short cycles, that is, the information about the passenger's position on the assistant driver's seat side and the information about the malfunction of the units. Similarly, these data will be called "dynamic data [A2]".

In the slave data 1 of the assistant driver's seat weight detecting control unit 3, there are stored the information about the weight on the assistant driver's seat or the weight of loadage and the information about the malfunction of the units. The data of the informations will be called "static data [C1]" because they have a low priority which would make no problem even if collected at long cycles. In the child seat (CRS) detecting control unit 4, there are stored the information about the presence and direction of the child seat and the information about the malfunction of the units. The data of the informations will be called "static data [D1]" because they have a low priority which would make no problem even if collected at long cycles. In the slave data 1 of the air bag operation selecting control unit 5, there are stored the information about the selection of whether the air bag 12 for the assistant driver is operated and the information about the malfunction of the units. The data of the informations will be called "static data [E1]" because it has a low priority which would make no problem even if collected at long cycles.

Further stored in the slave data 2 of the respective slave units 1–5 are the ID codes of the units 1–5 and the reserve data both of which are used for the ID check to detect the erroneous assembling of the respective slave units. The ID check will be described later. An expansion control unit 1 (slave 6) and an expansion control unit 2 (slave 7) are preparatory to the future establishment of slave units. Each of the units 1, 2 includes the slave data 1 and the slave data 2, as similar to the slave units 1–5. Note, the expansion control units may be established as the number of bits of address data contained in the command fed from the master unit 10 to the slave unit.

[1st. Example of Communication Method]

Figure 7:
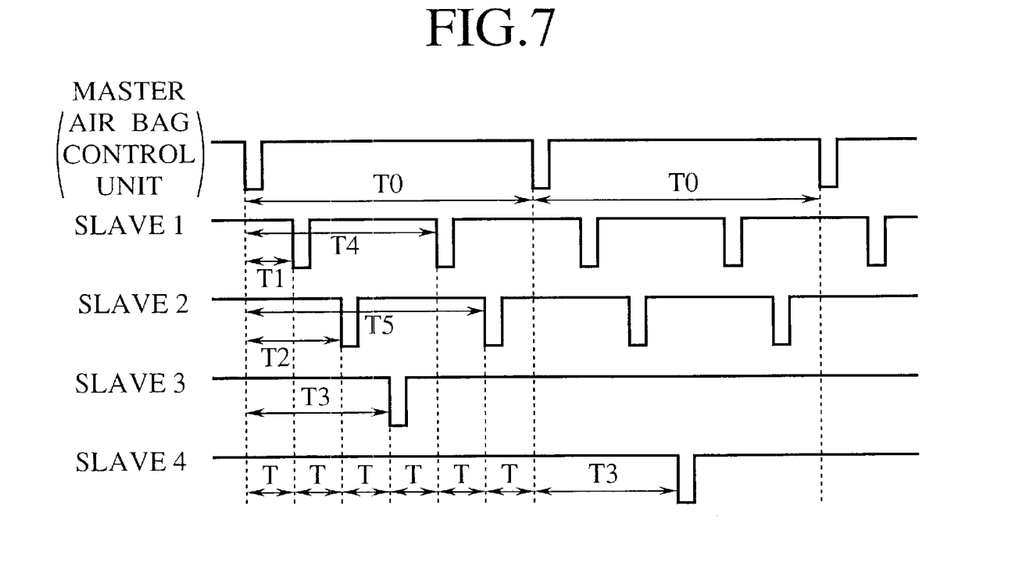
FIG. 7 is a time chart showing a communicating method between the master unit and the slave units 1 to 4.

FIG. 7 is a time chart showing a method of communicating the master unit 10 with the slave units 1–4 when the slave unit 5 and the expansion units 1, 2 are not arranged, for ease to understand the explanation. With reference to FIG. 7, we now describe the steps in the normal communication.

The master unit 10 does not provide the command against the slave units 1–4 individually but simultaneously provides the command for requiring the slave data 1 against all the slave units 1–4 at a communication cycle T0 (=6·T). The command is identical to the same where the addresses of the slave units 3, 4 with the static data only are nominated in order. Thus, the command is composed of two kinds of commands: ① a command with the address of slave 3; ② a command with the address of slave 4. These commands are sequentially fed to all of the slave units 1–4 (the order of ①→②→① Therefore, the communication cycle T0 is identical to a cycle at which the master unit 10 provides the command for the slave unit.

Upon receipt of the command, the slave unit 1 operates to reply the dynamic data [A1] to the master unit 10 in respective moments when time T1 (=6·T) and T4 (=4T) has passed since the rising of command, in spite of no address nominated by the command. That is, the slave unit 1 twice replies the dynamic data [A1] at intervals of communication cycle T0. In these dynamic data [A1], the latest informations about the position of the passenger on the driver's seat and the malfunction are stored every points of transmission.

Similarly, the slave unit 2 upon receipt of the command operates to reply the dynamic data [B1] to the master unit 10 in respective moments when time T2 (=2T) and T5 (=5T) has passed since the rising of command, in spite of no address nominated by the command. That is, the slave unit 2 twice replies the dynamic data [B1] at intervals of communication cycle T0. In these dynamic data [B1], the latest informations about the position of the passenger on the assistant driver's seat and the malfunction are stored every point of transmission.

On the other hand, the slave unit 3 upon receipt of the command ① (with the address of slave 3) operates to reply the static data [C1] to the master unit 10 in a moment when time T3 (=3T) has passed since the rising of command. In this static data [C1], the latest informations about the weight of the passenger on the assistant driver's seat and the malfunction are stored at a point of transmission. Note, although the slave unit 4 simultaneously receives the command ① at that time, the unit 4 does not reply since it is not nominated by the command address.

Further, the slave unit 4 upon receipt of the command ② (with the address of slave 4) at the next communication cycle operates to reply the static data [D1] to the master unit 10 in a moment when time T3 (=3T) has passed since the rising of command. In this static data [D1], the latest informations about both presence and direction of the child seat and the malfunction are stored at a point of transmission. Note, although the slave unit 3 simultaneously receives the command ② at that time, the unit 3 does not reply since it is not nominated by the command address.

When the above-mentioned first communicating method is carried out, there appears data of [(S3)CMD], [A1], [B1], [C1], [A1], [B1], [(S4)CMD], [A1], [B1], [D1], [A1], [B1], [(S3)CMD] . . . in order, on the communication line 13. Here, the data [(S3)CMD] represents a command to require a reply of the static data [C1] from the slave unit 3 and the data [(S4)CMD] represents a command to require a reply of the static data [D1] from the slave unit 4.

That is, the first communicating method is summarized by the pattern of [CMD], [A], [B], [X], [A], [B], [CMD] . . . in order. Here, [CMD] denotes the data [(S3)CMD] or the data [(S3)CMD], [A] denotes the data [A1], and [B] denotes the data [B1]. Further, [X] denotes the data [C1] or [D1]. Thus, against the slave units 1, 2 having the dynamic data [A1], [B1] requiring the frequent sampling, there are carried out twice communications for every communication cycle T0. While, against the slave units 3, 4 having the static data of low priority, there is alternately carried out one communication for every communication cycle T0.

According to the first communication steps, the dynamic data [A1], [B1] of the slave units 1, 2 are fed to the master unit 10 every communication cycle 3T respectively, while the static data [C1], [D1] of the slave units 3, 4 are fed to the master unit 10 every communication cycle 12T respectively. That is, without changing the communication object and cycle on detection of the vehicle's collision, the information of high priority about the passenger's position can be collected every short cycle 3T while the other informations of low priority are collected every long cycle 12T, i.e. 4 times as long as the short cycle 3T.

[2nd. Example of Communication Method]

Next, we describe the steps in the normal communication upon the establishment of the slave unit 5.

The master unit 10 simultaneously provides the command for requiring the slave data 1 against all the slave units 1–5 at the communication cycle T0 (=6·T). The command is identical to one where the addresses of the slave units 3–5 with the static data only are nominated in order. According to the afore-mentioned expressing form, it is composed of three kinds of commands: ① [(S3)CMD]; ② [(S4)CMD]; ③ [(S5)CMD]. These commands are sequentially fed to all of the slave units 1–5 (the order of ①→②→③→① . . . ).

Similarly to the above-mentioned 1st. communication method, the slave unit 1 operates to reply the dynamic data [A1] to the master unit 10 in respective moments when time T1 (=T) and T4 (=4T) has passed since the rising of command, in spite of no address nominated by the command. That is, the slave unit 1 twice replies the dynamic data [A1] at intervals of communication cycle T0. In these dynamic data [A1], the latest informations about the position of the passenger on the driver's seat and the malfunction are stored every point of transmission.

Again, the slave unit 2 operates to reply the dynamic data [B1] to the master unit 10 in respective moments when time T2 (=2T) and T5 (=5T) has passed since the rising of command, in spite of no address nominated by the command. That is, the slave unit 2 twice replies the dynamic data [B1] at intervals of communication cycle T0. In these dynamic data [B1], the latest informations about the position of the passenger on the assistant driver's seat and the malfunction are stored every point of transmission.

The slave unit 3 upon receipt of the command ①[(S3)CMD] operates to reply the static data [C1] to the master unit 10 in a moment when time T3 (=3T) has passed since the rising of command. Then, the slave units 4, 5 do not reply since there is no address nominated by the command. Further, the slave unit 4 upon receipt of the command ②[(S4)CMD] at the next communication cycle operates to reply the static data [D1] to the master unit 10 in a moment when time T3 (=3T) has passed since the rising of command. Then, the slave units 3, 5 do not reply since there is no address nominated by the command. Further, the slave unit 5 upon receipt of the command ③[(S5)CMD] at the next communication cycle operates to reply the static data [E1] to the master unit 10 in a moment when time T3 (=3T) has passed since the rising of command. Then, the slave units 3, 4 do not reply since there is no address nominated by the command.

When the above-mentioned second communicating method is carried out, there appears data of [(S3)CMD], [A1], [B1], [C1], [A1], [B1], [(S4)CMD], [A1], [B1], [D1], [A1], [B1], [(S5)CMD], [A1], [B1], [E1], [A1], [B1], [(S3) CMD] . . . in order, on the communication line 13. Note, the data [(S5)CMD] represents a command to require a reply of the static data [E1] from the slave unit 5.

According to the above expression of the first communicating method, the second communicating method is summarized by the pattern of [CMD], [A], [B], [X], [A], [B], [CMD] . . . in order, which is different from the first communicating method in point that the data [X] represents any one of [C1], [D1] and [E1] although the pattern of the second communicating method is formally identical to that of the first communicating method. According to the second communicating method, against the slave units 1, 2 having the dynamic data [A1], [B1] requiring the frequent sampling, there are carried out twice communications for every communication cycle T0. While, against the slave units 3, 4, 5 having the static data of low priority, there is alternately carried out one communication for every communication cycle T0.

According to the second communication method, the dynamic data [A1], [B1] of the slave units 1, 2 are fed to the master unit 10 every communication cycle 3T respectively, while the static data [C1], [D1], [E1] of the slave units 3, 4, 5 are fed to the master unit 10 every communication cycle 18T respectively. That is, without changing the communication object and cycle on detection of the vehicle's collision, the information of high priority about the passenger's position can be collected every short cycle 3T while the other informations of low priority are collected every long cycle 18T, i.e. 6 times as long as the short cycle 3T.

[3rd. Example of Communication Method]

In the above-mentioned first and second communicating methods, it is executed to reply the dynamic data twice every communication cycle. Now, we describe the third communicating method of replying the dynamic data once for every communication cycle.

Figure 8:
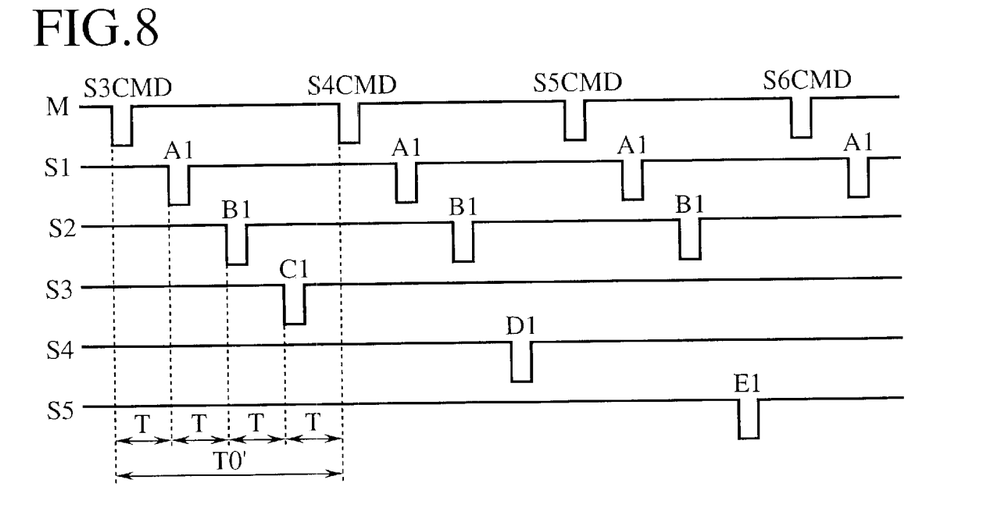
FIG. 8 is a time chart showing a communicating method between the master unit and the slave units 1 to 5.

FIG. 8 is a time chart showing the third method of communicating the master unit 10 with the slave units 1–5 normnally.

The master unit 10 simultaneously provides the command for requiring the slave data 1 against all the slave units 1–5 at a communication cycle T0' (=4·T). The command is identical to one where the addresses of the slave units 3–5 with the static data only are nominated in order. Thus, the command is composed of three kinds of commands: ① [(S3)CMD]; ② [(S4)CMD]; ③ [(S5)CMD]. These commands are sequentially fed to all of the slave units 1–5 (the order of ①→②→③→① . . . ).

Upon receipt of the command, the slave unit 1 operates to reply the dynamic data [A1] to the master unit 10 in respective moments when time T1 (=T) and T4 (=4T) has passed since the rising of command, in spite of no address nominated by the command. That is, the slave unit 1 once replies the dynamic data [A1] at intervals of communication cycle T0'. In these dynamic data [A1], the latest information about the position of the passenger on the driver's seat and the malfunction is stored every point of transmission.

Similarly, the slave unit 2 upon receipt of the command operates to reply the dynamic data [B1] to the master unit 10 in respective moments when time T2 (=2T) has passed since the rising of command, in spite of no address nominated by the command. That is, the slave unit 2 replies the dynamic data [B1] once at intervals of communication cycle T0'. In these dynamic data [B1], the latest informations about the position of the passenger on the assistant driver's seat and the malfunction are stored every point of transmission.

On the other hand, the slave unit 3 upon receipt of the command ① [(S3)CMD] operates to reply the static data [C1] to the master unit 10 in a moment when time T3 (=3T) has passed since the rising of command. In this static data [C1], the latest informations about the weight of the passenger on the assistant driver's seat and the malfunction are stored at a point of transmission. Note, although the slave units 4, 5 simultaneously receive the command (①at that time, the units 4, 5 do not reply since there are not nominated by the command addresses.

Further, the slave unit 4 upon receipt of the command .②[(S4)CMD] at the next communication cycle operates to reply the static data [D1] to the master unit 10 in a moment when time 3T has passed since the rising of command. In this static data [D1], the latest informations about the presence and direction of the child seat at a point of transmission are stored. Note, although the slave units 3, 5 simultaneously receive the command ②at that time, the units 3, 5 do not reply since they are not nominated by the command addresses.

Further, the slave unit 5 upon receipt of the command ③[(S5)CMD] at the next communication cycle operates to reply the static data [E1] to the master unit 10 in a moment when time 3T has passed since the rising of command. In this static data [E1], the latest informations about the selection of the operative or inoperative air bag 12 on the assistant driver's seat and the malfunction of unit at a point of transmission are stored. Note, although the slave units 3, 4 simultaneously receive the command ③)at that time, the units 3, 4 do not reply since there are not nominated by the command addresses.

When the above-mentioned third communicating method is carried out, there appears data of [(S3)CMD], [A1], [B1], [C1], [(S4)CMD], [A1], [B1], [D1], [(S5)CNMD], [A1], [B1], [E1], [(S3)CMD] . . . in order, on the communication line 13.

According to the above expression of the first communicating method, the third communicating method is summarized by the pattern of [CMD], [A], [B], [X], [CMD] . . . in order. Here, [X] denotes any one of the data [C1], [D1] and [E1]. According to the third communicating method, against the slave units 1, 2 having the dynamic data requiring the frequent sampling, there is carried out one communication for every communication cycle T0'. While, against the slave units 3, 4, 5 having the static data of low priority, there is alternately carried out one communication for every communication cycle T0'.

According to the third communication method, the dynamic data [A1], [B1] of the slave units 1, 2 are fed to the master unit 10 every communication cycle 4T respectively, while the static data [C1], [D1], [E1] of the slave units 3, 4, 5 are fed to the master unit 10 every communication cycle 12T respectively. That is, without changing the communication object and cycle on detection of the vehicle's collision, the information of high priority about the passenger's position can be collected every short cycle 4T while the other informations of low priority are collected every long cycle 12T, i.e. 4 times as long as the short cycle 3T.

[Other Examples of Communication Method]

We now describe the communication method in case of changing the number of slave units having the dynamic data and the number of times of communicating the dynamic data at every communication cycle.

Assuming that there is only one slave unit having the dynamic data (S3, [A]) in the normal communication between the master unit and five slave units and further assuming to execute the communication with the slave unit having the dynamic data once for every communicating cycle while executing the communication with the other slave units having the static data in sequence for every communicating cycle, then the communicating steps are expressed by the pattern of [CMD], [A], [X], [CMD] . . . in order. Here, the data [X] denotes any one of the data [B], [C], [D] and [E]. In this case, the cycle to collect the dynamic data [A] is equal to 3T, while the cycle to collect the static data [B], [C], [D] and [E] amounts to 12T. Therefore, also in this case, without changing the communication object and cycle on detection of the vehicle's collision, the information of high priority about the passenger's position can be collected every short cycle 3T while the other informations of low priority are collected every long cycle 12T.

Assuming that there is only one slave unit having the dynamic data (S3, [A]) in the normal communication between the master unit and five slave units and further assuming to execute the communication with the slave unit having the dynamic data twice for every communicating cycle while executing the communication with the other slave units having the static data in sequence for every communicating cycle, then the communicating steps are expressed by the pattern of [CMD], [A], [X], [A], [CMD] . . . in order. Here, the data [X] denotes any one of the data [B], [C], [D] and [E]. In this case, the cycle to collect the dynamic data [A] is equal to 2T, while the cycle to collect the static data [B], [C], [D] and [E] amounts to 16T. Therefore, also in this case, without changing the communication object and cycle on detection of the vehicle's collision, the information of high priority about the passenger's position can be collected every short cycle 2T while the other informations of low priority are collected every long cycle 16T.

Assuming that there are three slave units having the dynamic data (S3 [A]; S4 [B] S5 [C]) in the normal communication between the master unit and five slave units and further assuming to execute the communication with the slave units having the dynamic data once for every communicating cycle while executing the communication with the other slave units having the static data in sequence for every communicating cycle, then the communicating steps are expressed by the pattern of [CMD], [A], [B], [C], [X], [CMD] . . . in order. Here, the data [X] denotes either data [B] or [C]. In this case, the cycle to collect the dynamic data [A], [B] and [C] is equal to 5T, while the cycle to collect the static data [D] and [E] amounts to 10T. Therefore, also in this case, without changing the communication object and cycle on detection of the vehicle's collision, the information of high priority about the passenger's position can be collected every short cycle 5T while the other informations of low priority are collected every long cycle 10T.

Assuming that there are three slave units having the dynamic data (S3 [A]; S4 [B] S5 [C]) in the normal communication between the master unit and five slave units and further assuming to execute the communication with the slave units having the dynamic data twice for every communicating cycle while executing the communication with the other slave units having the static data in sequence for every communicating cycle, then the communicating steps are expressed by the pattern of [CMD], [A], [B], [C], [X], [A], [B], [C], [CMD] . . . in order. Here, the data [X] denotes either data [D] or [E]. In this case, the cycle to collect the dynamic data [A], [B] and [C] is equal to 4T, while the cycle to collect the static data [D] and [E] amounts to 16T. Therefore, also in this case, without changing the communication object and cycle on detection of the vehicle's collision, the information of high priority about the passenger's position can be collected every short cycle 4T while the other informations of low priority are collected every long cycle 16T.

[Communication Method in Checking ID of Slave Units]

Since the specification and performance of the slave units 1–5 are different from each other for each vehicle, it is necessary to prevent their erroneous assembling to the vehicle upon the completion of ID checking of the slave units 1–5. We now describe the communicating steps in this ID check.

As mentioned before, against the slave units 1–5, there are respectively established ID (numbers) which are also stored in the memories $1c$–$5c$ as the slave data 2, respectively. Also in the memory $10d$ of the master unit 10, there are stored ID (numbers) of the slave units 1–5 which may be mounted on the vehicle equipped with the unit 10. On the communication with the slave units 1–5, the master unit 10 operates to compare respective ID (numbers) of the built-in slave units 1–5 with ID (numbers) on memory. Then, if there is at least one inconsistent slave unit, the master unit 10 judges that it is identical to a slave unit being assembled by mistake.

In operation, the master unit 10 transmits the commands: ① [(A2)CMD], ② [(B2)CMD], ③ [(C2)CMD], ④ [(D2)CMD], ⑤ [(E2)CMD] to the respective slave units 1–5 in order of ①→②→③→④→⑤→①. Then, in response to the commands from the master unit 10, each of the slave units 1–5 replies the slave data 2 containing its own address and ID.

Figure 9:
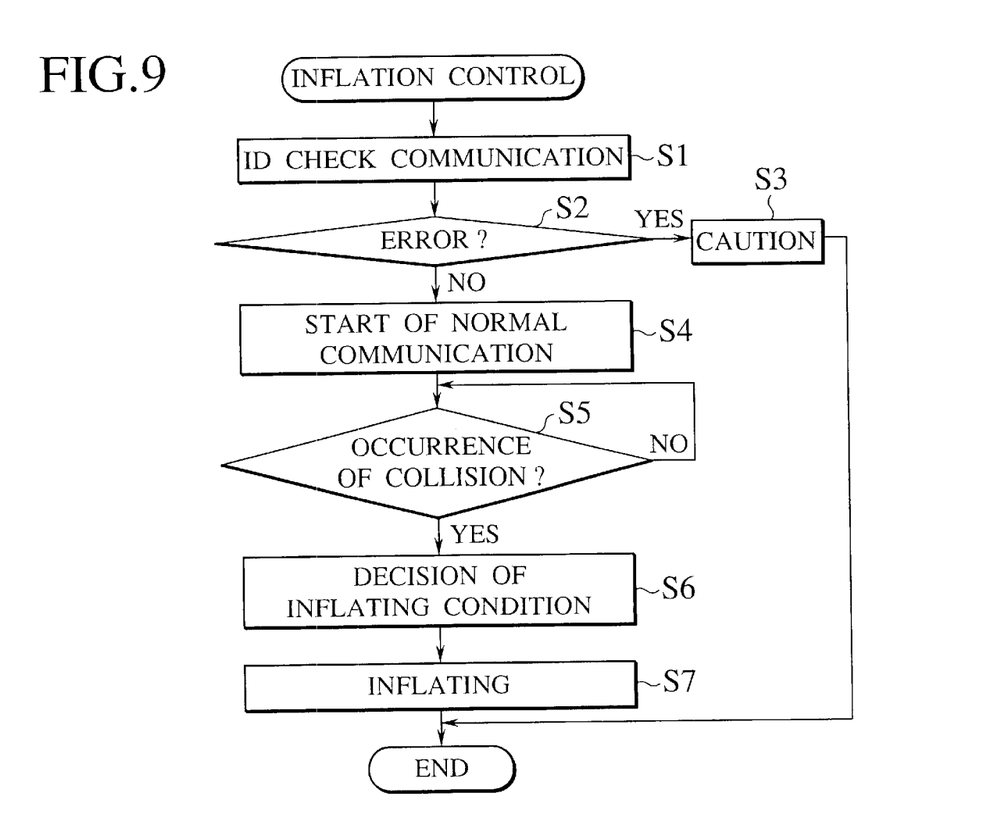
FIG. 9 is a flow chart showing an air bag inflation control program in accordance with one embodiment of the invention.

FIG. 9 is a flow chart showing the air bag inflation control program executed by the master unit 10. With reference to this flow chart, the inflating control of the embodiment will be described below, When the ignition switch 14 is closed (ON), the microcomputer $10a$ of the master unit 10 starts to execute the control program. At step S1, it is executed to communicate with the slave units 1–5 in accordance with the above-mentioned ID checking steps thereby to detect the erroneous assembling of the slave units 1–5. At step S2, when it is judged that the ID codes of the slave units 1–5 do not agree with the ID codes stored in the memory $10c$ or when there is no response of the slave data 2 from the slave units 1–5, the routine goes to step S3 where a caution is generated to complete the inflation control, on judgement of the presence of error.

If there is no error in the ID check, then the routine goes to step S4 to start the above-mentioned normal communication with the slave units 1–5 in order to collect the informations about the air bag inflation control. At step S5, it is judged whether or not the vehicle's collision happens on the ground of the vehicle's deceleration G detected by the G-sensor 10b. If the judgement at step S5 is Yes (occurrence of collision), then the routine goes to step S6. Note, as to the judgement of the vehicle's collision, there are a variety of judging methods introduced by many documents and therefore, their descriptions will be eliminated in this specification. At step S6, it is executed to determine the inflating condition, such as inflating pressures and speeds of the air bags 11, 12, on the basis of both dynamic and static data obtained by the slave units 1–5. Subsequently, at next step S7, the air bags 11, 12 are inflated by the drive circuits 10e, 10f, in accordance with the so-determined inflating condition.

In the above-mentioned embodiment, all of the passenger's position (driver's seat side) detecting control unit 1 (i.e. slave unit 1), the passenger's position (assistant driver's seat side) detecting control unit 2 (i.e. slave unit 2), the weight (assistant driver's seat side) detecting control unit 3 (i.e. slave unit 3), the child seat detecting control unit 4 (slave unit 4) and the air bag (assistant driver's seat) operation selecting control unit 5 (slave unit 5) constitute the terminal units of the invention. The air bag control unit 10 (master unit 10) constitutes the central control unit of the invention, while the air bags 11, 12 constitute the passenger protecting units of the invention.

According to the present invention, since the passenger protecting device carries out the communication with the terminal units detecting the informations of high priority at intervals of the predetermined cycle and also carries out the communication with the terminal units detecting the informations of low priority in sequence at intervals of the predetermined cycle, it is possible to reasonably collect various informations at appropriate intervals corresponding to the priority of information without changing the communication method with the plural terminal units before and after the vehicle's collision.

In detail, since the passenger protecting device determines both inflating pressure and inflating speed of each air bag on the basis of the information about the passenger's position before and after the vehicle's collision, it is possible to protect the passenger certainly.

Further, according to the invention, since the passenger protecting device carries out the communication with the terminal unit having the information of high priority several times for each of intervals of the predetermined cycle, it is possible to collect the informations of high priority at further short cycles.

The entire contents of Japanese Patent Application P10-369675 (filed Dec. 25, 1998) is incorporated herein by reference.

Although the invention has been described above by reference to one embodiment of the invention, the invention is not limited to the embodiment described above. Modifications and variations of the embodiments described above will occur to those skilled in the art, in light of the above teachings.

The scope of the invention is defined with reference to the following claims.

What is claimed is:

1. A passenger protecting device for a vehicle, comprising:

a passenger protecting unit to be arranged in the vicinity of a passenger on the vehicle, for protecting the passenger, a plurality of terminal units arranged in the vehicle, for detecting a plurality of information about the passenger and a loadage on the seat; and a central control unit which communicates with the plural terminal units through a single communication line at intervals of a predetermined cycle thereby to collect the plural information and which determines the operating condition of the passenger protecting unit and also controls the operation of the passenger protecting unit;

wherein the central control unit carries out the communication with at least one terminal unit detecting an information of high priority at every interval of the predetermined cycle and also carries out the communication with the other terminal units detecting other information of low priority in a sequential manner such that communication occurs with a different terminal unit detecting low priority information than in an immediately adjacent interval.

2. The passenger protecting device of claim 1, wherein the central control unit carries out the communication with the terminal unit having the information of high priority several times for each of intervals of the predetermined cycle.

3. The passenger protecting device of claim 1, wherein the passenger protecting unit comprises an air bag to be inflated in accordance with the operation condition of the passenger protecting unit, and wherein the information of high priority includes an information about the passenger's position, while the central control unit determines both inflating pressure and inflating speed of the air bag on the basis of the information about the passenger's position.

4. The passenger protecting device of claim 1, wherein the passenger protecting unit comprises an air bag to be inflated in accordance with the operation condition of the passenger protecting unit, and wherein the information of low priority includes at least one of information about the presence of the seated passenger, the presence of the passenger fastened by a seat belt and the presence of a child seat, while the central control unit determines whether or not to inflate the air bag on the basis of the one of information.

5. The passenger protecting device of claim 1, wherein the passenger protecting unit comprises an air bag to be inflated in accordance with the operation condition of the passenger protecting unit, and wherein the information of low priority contains information about the presence of the seated passenger, the presence of the passenger fastened by a seat belt and the presence of a child seat, while the central control unit determines whether or not to inflate the air bag on the basis of the information.

6. A method of protecting a passer in a vehicle using a passenger protecting device for a vehicle, comprising:

a passenger protecting unit to be arranged in the vicinity of a passenger on the vehicle, for protecting the passenger, a plurality of terminal units arranged in the vehicle, for detecting a plurality of information about the passenger and a loadage on the vehicle; and a central control unit which communicates with the plural terminal units through a single communication line at intervals of a predetermined cycle thereby to collect the plural information and which determines the operating condition of the passenger protecting unit and also controls the operation of the passenger protecting unit;

the method comprising the steps of:

carrying out the communication with at least one terminal unit detecting an information of high priority at every interval of the predetermined cycle; and carrying out the communication with the other terminal units detecting other information of low priority in a sequential manner such that communication occurs with a different terminal unit detecting low priority information than in an immediately adjacent interval.

7. The method of protecting a passenger of claim 6, wherein the communication with the terminal unit having the information of high priority is carried out several times for each of intervals of the predetermined cycle.

8. The method of protecting a passenger of claim 6, wherein the passenger protecting unit comprises an air bag to be inflated in accordance with the operation condition of the passenger protecting unit, and wherein the information of high priority includes an information about the passenger's position, and the central control unit determines both inflating pressure and inflating speed of the air bag on the basis of the information about the passenger's position.

9. The method of protecting a passenger of claim 6, wherein the passenger protecting unit comprises an air bag to be inflated in accordance with the operation condition of the passenger protecting unit, and wherein the information of low priority includes at least one of information about the presence of the seated passenger, the presence of the passenger fastened by a seat belt and the presence of a child seat, and the central control unit determines whether or not to inflate the air bag on the basis of the one of information.

10. The method of protecting a passenger of claim 6, wherein the passenger protecting unit comprises an air bag to be inflated in accordance with the operation condition of the passenger protecting unit, and wherein the information of low priority contains information about the presence of the seated passenger, the presence of the passenger fastened by a seat belt and the presence of a child seat, and the central control unit determines whether or not to inflate the air bag on the basis of the information.

* * * * *